(12) United States Patent
Edwards

(10) Patent No.: US 7,461,822 B2
(45) Date of Patent: Dec. 9, 2008

(54) OBSERVATION STAND ACCESSORY

(76) Inventor: Gary Edwards, 2901 County Rd., #38, Jemison, AL (US) 35085

( * ) Notice: Subject to any disclaimer, the term of this patent is extended or adjusted under 35 U.S.C. 154(b) by 451 days.

(21) Appl. No.: 11/212,805

(22) Filed: Aug. 29, 2005

(65) Prior Publication Data

US 2007/0045490 A1     Mar. 1, 2007

(51) Int. Cl.
*A47B 96/06*     (2006.01)
(52) U.S. Cl. .................. 248/214; 248/215; 108/97; 108/98
(58) Field of Classification Search ............... 248/214, 248/230.6, 231.71, 218, 318, 215; 108/134, 108/135, 25, 26, 97, 98; 182/136, 135, 187, 182/129; 383/9
See application file for complete search history.

(56) References Cited

U.S. PATENT DOCUMENTS

| | | | | |
|---|---|---|---|---|
| 522,186 A | * | 7/1894 | Andrews | 224/439 |
| 2,638,394 A | * | 5/1953 | Ulrich | 108/34 |
| 2,710,643 A | * | 6/1955 | Wincey et al. | 297/174 CS |
| 3,397,010 A | * | 8/1968 | Leimgruber | 297/174 CS |
| 4,122,780 A | * | 10/1978 | Brickman | 108/25 |
| 4,625,655 A | * | 12/1986 | Brickman | 108/25 |
| 4,708,221 A | | 11/1987 | Kubiak | |
| 5,046,433 A | * | 9/1991 | Kramer et al. | 108/44 |
| 5,417,353 A | * | 5/1995 | Stall | 224/401 |
| 5,941,484 A | | 8/1999 | Stepney, III et al. | |
| 6,086,031 A | | 7/2000 | Renfro | |
| 6,205,935 B1 | | 3/2001 | Lindaman | |
| 6,298,944 B1 | | 10/2001 | Forbes et al. | |
| 6,575,626 B1 | | 6/2003 | Gillespie, Jr. et al. | |
| 2002/0158093 A1 | | 10/2002 | Westimayer | |

* cited by examiner

*Primary Examiner*—Gwendolyn Baxter
(74) *Attorney, Agent, or Firm*—Wm. Randall May

(57) ABSTRACT

A storage apparatus for use with outdoor observation stands is disclosed. The apparatus provides stable and practical support for placing, holding, storing and providing convenient access to food, drink, gear and supplies useful or necessary to hunters or observers utilizing a tree-mounted observation stand. The invention includes a retractable framework which incorporates a flexible panel having geometrically specific compartments for holding a variety of objects. The design of the invention allows the apparatus to securely store and hold heavy objects such as binoculars, ammunition, food and beverages and provides accessibility to such objects with minimal bodily movement.

15 Claims, 4 Drawing Sheets

OBSERVATION STAND ACCESSORY

FIELD OF THE INVENTION

This invention relates generally to temporary storage devices useful to hunters, wildlife observers and outdoor enthusiasts. More particularly, the present invention relates to an improved storage accessory designed for use with hunting or wildlife observation stands or platforms.

BACKGROUND OF THE INVENTION

Observation stands, such as climbing stands, ladder stands, lock-on stands and the like are frequently used by hunters, wildlife observers and outdoor enthusiasts to assist them in hunting and/or observing wildlife, game or prey. Observation stands are usually attached or mounted to large trees and are placed at a desired elevation on the tree (typically 12 to 25 feet from ground level) for hunting or observing a particular animal or other wildlife indigenous to the area. Observation stands may be portable or may be permanently mounted and typically comprise frame members forming one or more platforms for providing the hunter or observer with a small place to sit and/or stand.

The use of an elevated observation stand to hunt or observe game or wildlife gives the hunter or observer a number of advantages such as remaining above the normal field of view of the wildlife, game or prey, raising the scent of the hunter or observer above the wildlife, game or prey and increasing the hunter's or observer's range of vision. However, due to the nature of the activity, a hunter or observer will normally spend a minimum of several hours in an observation stand hunting or observing wildlife or game. For this reason, hunters or observers utilizing such stands must carry with them whatever food, drink, gear or supplies that they may need or require during their stay in the observation stand. Once the hunter or observer has gained access to and, along with his or her gear and supplies, is situated within the observation stand, his or her bodily movements must necessarily be restricted or minimized in order to avoid detection by the wildlife, game or prey being sought. Adequate, stable, convenient and practical means for holding and storing, and for providing ready access to, the hunter's or observer's food, drink, gear and supplies; and which minimizes bodily movements necessary to reach and retrieve these needed items, is therefore highly desirable.

It would be expedient; therefore, to provide an improved apparatus for securely and safely holding, storing and providing convenient access to the food, drink, gear and supplies of a hunter or observer utilizing a tree-mounted observation stand.

Known devices, such as those disclosed in applicant's information disclosure statement submitted herewith, are not without undesirable features, disadvantages, disabilities and/or limitations.

The present invention is a substantial modification and significant improvement over known designs and incorporates unique and novel design features which distinguish the invention over existing art.

SUMMARY OF THE INVENTION

In view of the foregoing, it is a primary object of this invention to provide a new and improved storage apparatus for use with outdoor observation stands. The design and construction of the apparatus provides a stable and convenient means for placing, holding, storing, and for providing easy access to, items useful or necessary to a hunter or wildlife observer during extended stays in an outdoor observation stand.

According to an embodiment of the invention, an observation stand accessory for holding, storing and placement of useful or needed items such as food, beverage containers, observation equipment, hunting equipment and/or other hunting or observation paraphernalia, gear or supplies, comprises a retractable hinged framework having mounting brackets for securely attaching the framework to a horizontal frame member of a typical observation stand and having a flexible compartment means attached to, and deployable within, said retractable framework wherein said compartment means, once deployed, provides additional securing means for the framework and provides a taut horizontal surface area having one or more open compartments suspended therefrom.

An important advantage of the present invention is the provision of an observation stand accessory which can be easily attached to any observation stand having a horizontal frame member.

Another advantage of the present invention is the provision of an observation stand accessory that, when fully deployed, provides a flat, table-like surface having one or more compartments designed for securing, supporting, holding and/or storing useful items.

Another advantage of the present invention is the provision of an observation stand accessory having compartments capable of safely supporting and holding heavy items such as binoculars, ammunition, food and beverages.

Another advantage of the present invention is the provision of an observation stand accessory capable of supporting and holding beverage or other containers in an upright and secure position.

Another advantage of the present invention resides in the ability to easily and securely attach the apparatus to an observation stand frame member of virtually any geometric shape or configuration.

A further advantage of the present invention is the provision of an observation stand storage accessory having clamping mechanisms and stabilizing tie straps for securely attaching the apparatus to said observation stand thereby preventing the rotation, collapse, retraction or movement of the apparatus when in use.

A further advantage of the present invention resides in its lightweight construction, its convenience, and in the ability to easily collapse or retract the framework of the apparatus for storage and travel when not in use.

Another advantage of the present invention is the provision of an observation stand accessory for supporting, holding and storing useful items that allows the stand occupant to easily reach said items with minimal bodily movement.

BRIEF DESCRIPTION OF THE DRAWINGS

The foregoing and other objects, features, and advantages of the present invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION OF THE DRAWINGS

Figure 1:
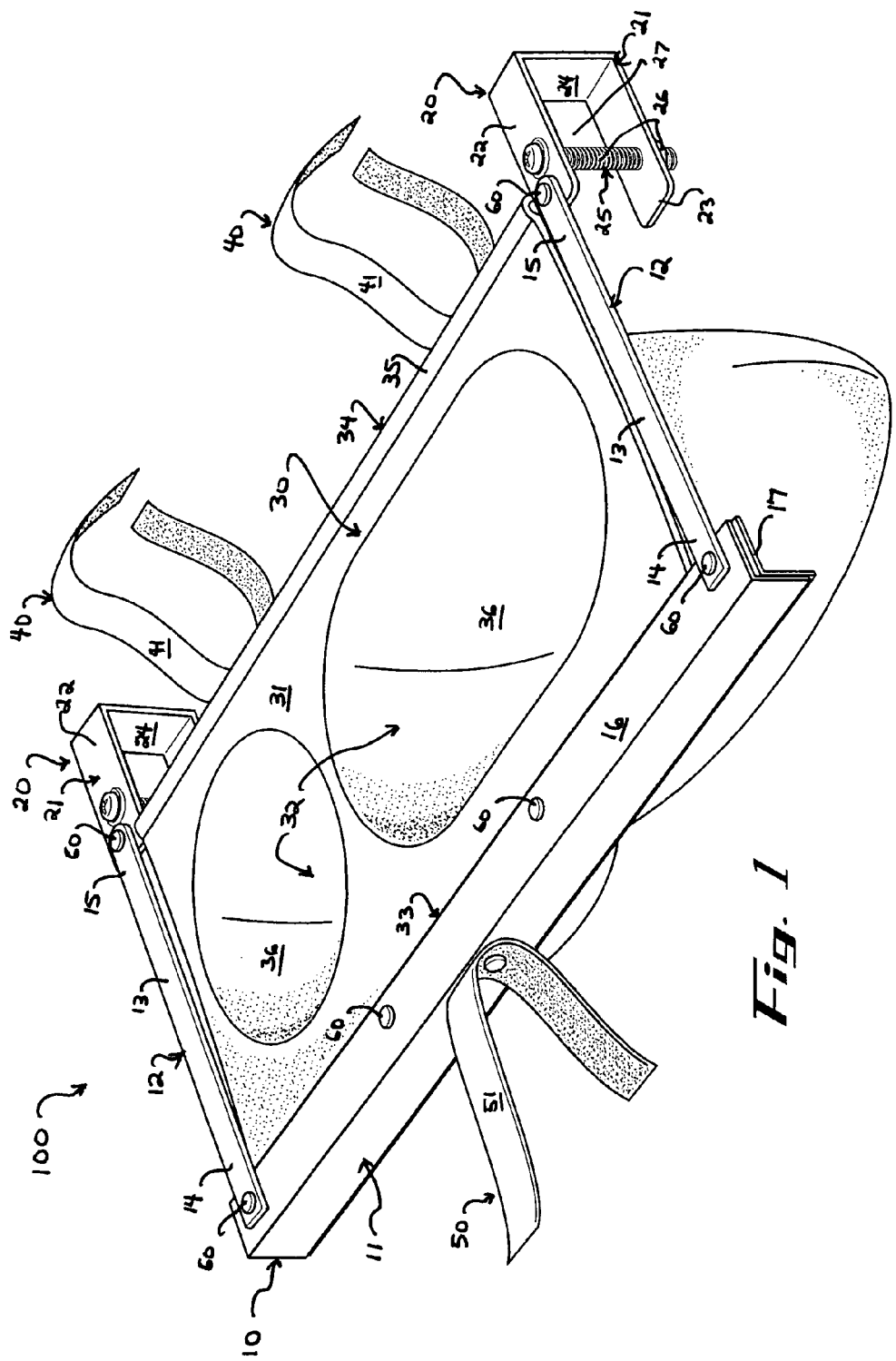
FIG. 1 is a perspective view of a preferred embodiment of the invention shown in a detached but fully deployed configuration.
Figure 5:
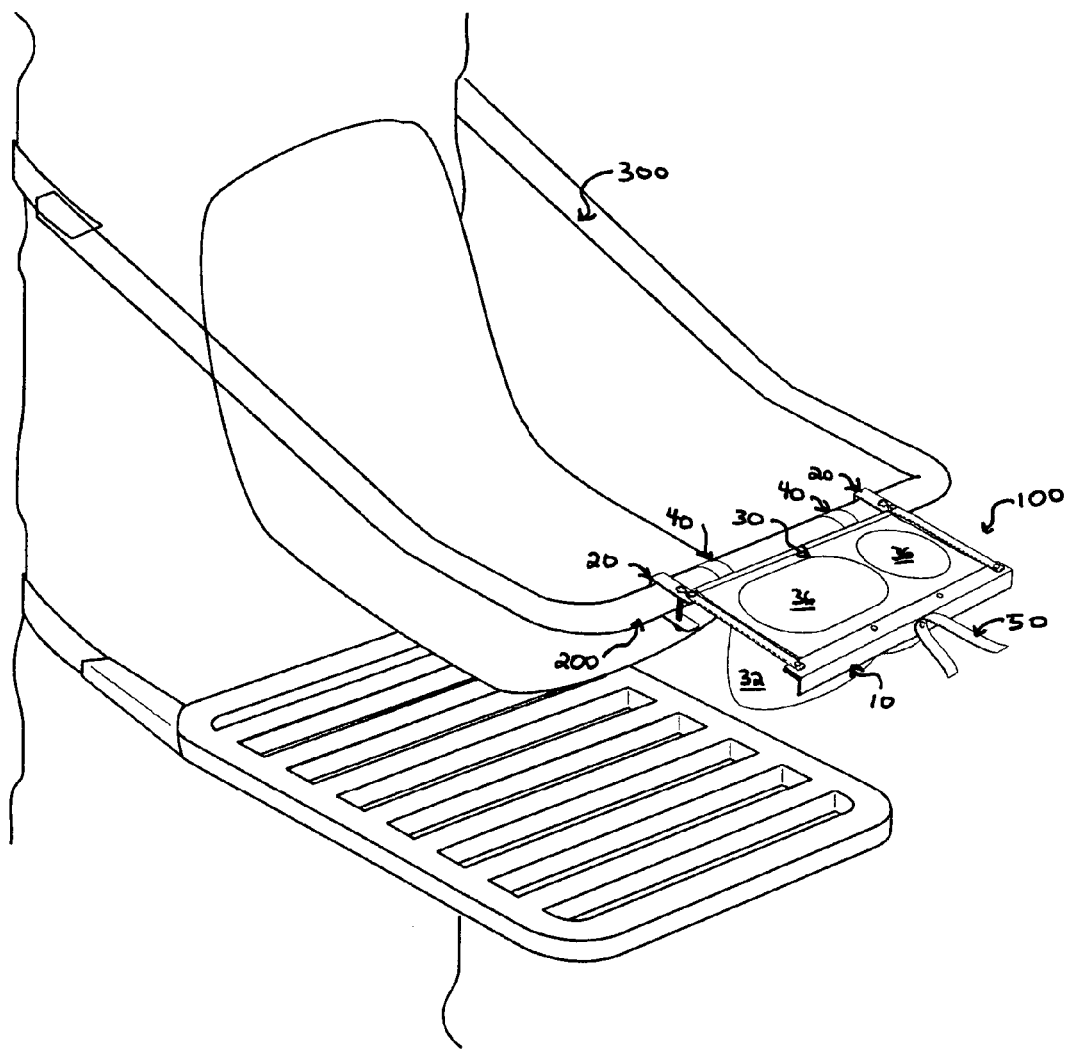
FIG. 5 is a prospective view of the embodiment of FIG. 1 showing the invention in a deployed configuration attached to a typical observation stand frame.

In accordance with an embodiment of the invention, FIG. 1 shows an observation stand accessory apparatus 100 designed for attachment to a typical tree-mounted observation stand 300 (depicted in FIG. 5) such as the climbing stands, ladder stands, lock-on stands and the like frequently used by hunters, wildlife observers and outdoor enthusiasts to assist them in hunting and/or observing wildlife, game or prey. The accessory apparatus 100 of FIG. 1 comprises a retractable or collapsible U-shaped frame assembly 10, a pair of mounting brackets 20 pivotally attached to said frame assembly 10, a compartment means 30, a pair of stabilizing straps 40 and a securing strap 50.

Figure 4:
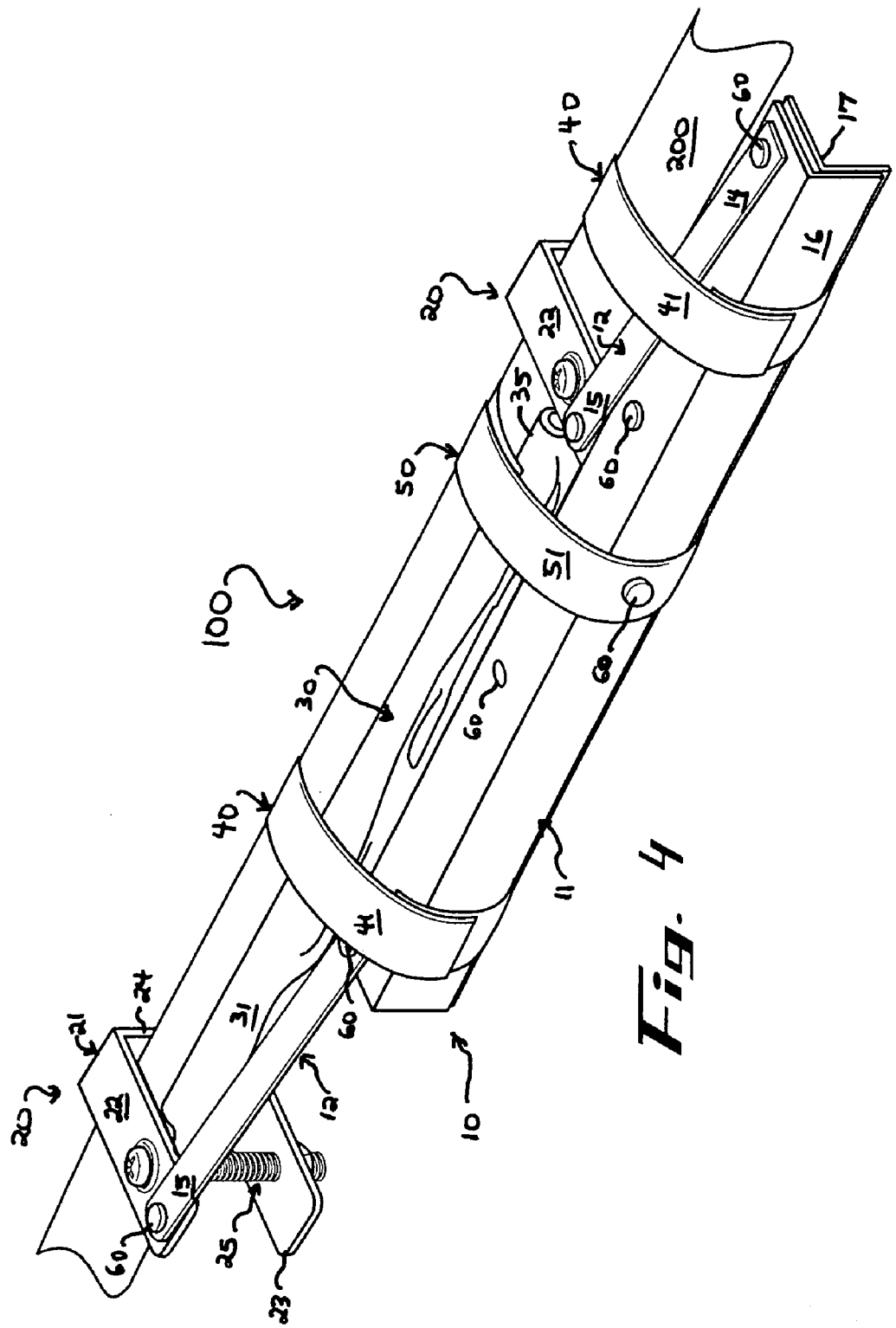
FIG. 4 is a prospective view of the embodiment of FIG. 1 showing the device in a fully retracted and secured configuration for storage or travel.

The frame assembly 10 comprises a central frame member 11 and two side support members 12. Each side support member 12 comprises a flat, rectangular-shaped, bar 13 having a forward end 14 and a trailing end 15. The central frame member 11 forms the leading edge of said U-shaped frame assembly 10 and comprises a pair of nested, L-shaped, upper and lower frame members 16 & 17 with said upper and lower members 16 & 17 being securely attached one to the other by a plurality of attachment means 60 such as rivets, bolts or pins. The forward end 14 of each side support member 12 is pivotably attached to one end of said central frame member 11 as shown, with the opposing or trailing end 15 of each said side support member 12 being pivotably attached to one of said mounting brackets 20. As shown in FIG. 4, the pivotable attachment of the central frame member 11 to the side support members 12 and the side support members 12 to the mounting brackets 20 in this manner allows the frame assembly 10, when the apparatus 100 is not in use or when the apparatus 100 is being stored for transport, to rotate or pivot laterally and to be retracted or collapsed in the direction of the horizontal plane occupied by the side support members 12. Pivotal attachment of the side support members 12 to the central frame member 11 and to the mounting brackets 20 is accomplished through the use of said attachment means 60.

Figure 2:
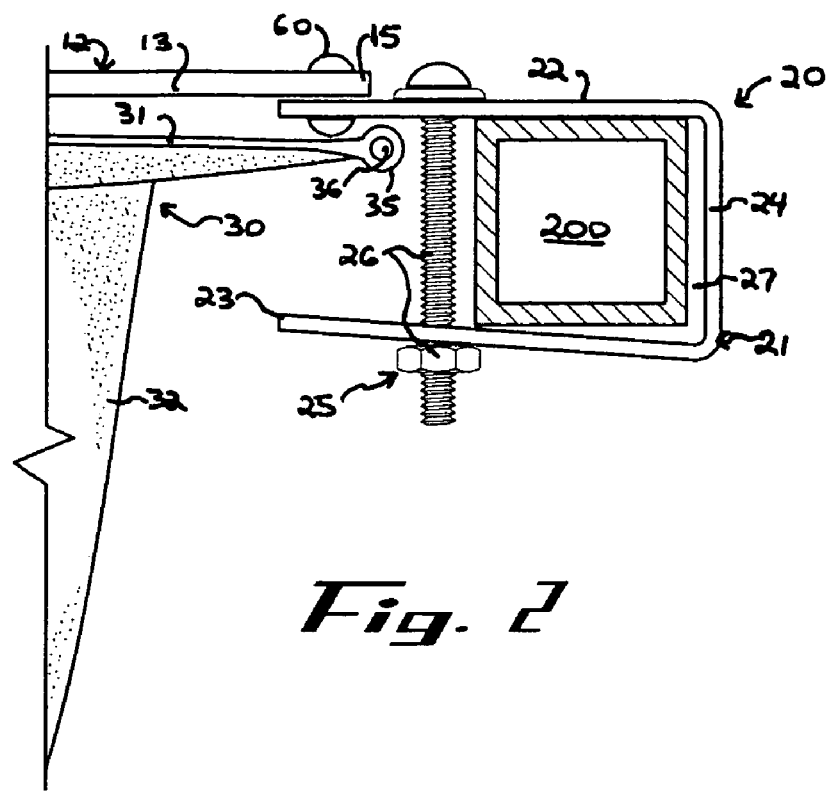
FIG. 2 is a partial right side view of the embodiment of FIG. 1 showing the clamping mechanism of the invention engaging an observation stand horizontal frame member having a square cross-section.
Figure 3:
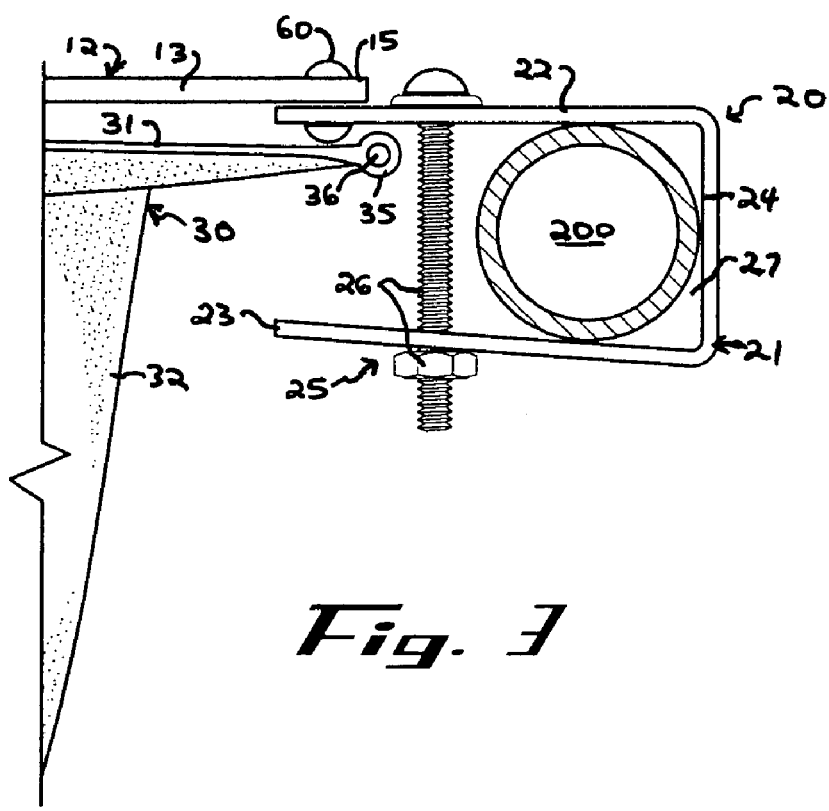
FIG. 3 is a partial right side view of the embodiment of FIG. 1 showing the clamping mechanism of the invention engaging an observation stand horizontal frame member having a circular cross-section.

The mounting brackets 20 of the present invention 100 each comprise a C-shaped clamp member 21 with each clamp member 21 having a top portion 22, a bottom portion 23, a connecting portion 24 and a means 25 for urging the bottom portion 23 towards the top portion 22. Said means 25 for urging said top portion 22 towards said bottom portion 23 of said clamp member 21 comprises, in this embodiment, a threaded bolt and nut assembly 26. As best shown in FIGS. 2 and 3, the bolt and nut assembly 26 of the present embodiment is positioned vertically through the top and bottom portions 22, 23 of said clamp member 21 as shown so as to form a space 27 between said bolt and nut assembly 26 and the connecting portion 24 of said clamp member 21 of sufficient size for receiving and securely holding a horizontal frame member 200 of said typical tree-mounted observation stand 300. The top portion 22 of the C-shaped clamp member 21 of each mounting bracket 20 also pivotally receives the trailing end 15 of one of said side support members 12 of said frame assembly 10.

The compartment means 30 of the present invention comprises a rectangular panel 31 of lightweight flexible material, such as nylon mesh, having one or more holding or storage compartments 32 suspended therefrom. Said suspended compartments 32 are sewn or attached to said flexible panel 31 at openings 36 spaceably positioned along the surface of said panel 31. It is to be understood that said openings 36 may be designed having various geometric dimensions for receiving and/or holding a variety of items. The dimensions of said flexible panel 31 are substantially equal to the dimensions of the frame assembly 10 having a length substantially equal to that of the central frame member 11 of said frame assembly 10 and a width substantially equal to that of the side support members 12 of said frame assembly 10. Said flexible panel further comprises a forward edge 33 and a rear edge 34. The forward edge 33 of said section 31 is "sandwiched" between the nested upper and lower frame members 13 & 14 of the central frame member 11 of the frame assembly 10 and is firmly held in place between said upper and lower frame members 13 & 14 by virtue of said attachment means 60. The rear edge 34 of said section 31 is formed so as to comprise a sleeve 35, which runs the entire length of said rear edge 34, for receiving and housing a rigid pin member 36. The holding or storage compartments 32 of said compartment means 30 may be of varying dimensions and may be designed to hold items of specific dimensions such as beverage containers and other similar items where it is preferable that the items be separated from other items or that the items remain in an upright position.

The stabilizing straps 40 of the present embodiment comprise elongated lengths of reusable self-adhering material 41, such as hook and loop fabric, which are permanently and spaceably attached to the rigid pin member 36 along the rear edge 34 of the flexible panel 31 of compartment means 30. The stabilizing straps 40 are designed to securely wrap around the horizontal frame member 200 of said typical tree-mounted observation stand 300 so as to deploy and pull taut the compartment means 30 and to prevent the retraction of the frame assembly 10 during use of the invention 100.

As best seen in FIGS. 1 & 4, the securing strap 50 comprises a length of reusable self-adhering material 51, such as hook and loop fabric, and is permanently attached to the central frame member 11 of frame assembly 10. Said strap 50 may be used to secure the invention 100, in a collapsed or retracted configuration, to the horizontal frame member 200 of a typical observation stand when not in use or when being transported. The securing strap 50 may also be used to secure the collapsed or retracted invention 100 to itself when not being used with an observation stand.

While the invention has been particularly shown and described with reference to the preferred embodiment thereof, it will be understood by those skilled in the art that various alterations in form, detail and construction may be made therein without departing from the spirit and scope of the invention.

The embodiment of the invention in which an exclusive property right or privilege is claimed are defined as follow:

1. An observation stand accessory apparatus for placing, holding and/or storing useful items comprising:

a collapsible frame assembly having a central frame member and two side support members, said side support members having a forward end and a trailing end, with said central frame member being pivotably attached at either end to the forward end of one of said side support members;

means, pivotally attached to the trailing end of each said side support members of said frame assembly, for mounting said frame assembly to a horizontal bar or similar structural member of a typical outdoor observation stand or platform;

a flexible panel member having one or more open storage compartments suspended therefrom wherein said panel member is attached along its forward edge to the central frame member of said frame assembly and wherein the rear edge of said panel member comprises a sleeve for receiving and housing a rigid pin member;

means for deploying and stabilizing said flexible panel member comprising one or more securing means permanently and spaceably attached to a rigid pin member of said panel member wherein said securing means is designed to be removably attached to said horizontal bar or similar structural member; and, means, attached to said collapsible frame assembly, for binding and securing said accessory apparatus, when said apparatus is in a collapsed or retracted configuration, to itself or to said horizontal bar or similar structural member of said typical outdoor observation stand or platform.

2. The apparatus of claim 1, wherein said central frame member of said frame assembly comprises a pair of nested, L-shaped, frame members securely attached one to the other.

3. The apparatus of claim 2, wherein said nested, L-shaped, frame members receive and securely hold the forward edge of said flexible panel member.

4. The apparatus of claim 1, wherein said means for mounting said frame assembly to said horizontal bar or similar structural member comprises at least two C-shaped clamp members.

5. The apparatus of claim 4, wherein said C-shaped clamp member further comprises a top portion, a bottom portion, a connecting portion and a means for urging said top portion towards said bottom portion.

6. The apparatus of claim 5, wherein said urging means comprises a bolt and nut assembly.

7. The apparatus of claim 1, wherein one or more of the open storage compartments of said flexible panel member are geometrically shaped to receive and maintain the position of items placed therein.

8. The apparatus of claim 1, wherein one or more of the open storage compartments of said flexible panel member are geometrically shaped so as to receive, hold and maintain a beverage container in an upright position.

9. The apparatus of claim 1, wherein said flexible panel member is comprised of lightweight material.

10. The apparatus of claim 9, wherein said lightweight material comprises nylon mesh fabric.

11. The apparatus of claim 1, wherein said securing means of said means for deploying and stabilizing said flexible panel member comprise elongated strap means.

12. The apparatus of claim 11, wherein said elongated strap means comprise lengths of self-adhering hook and loop material.

13. The apparatus of claim 1, wherein said means for binding and securing said accessory apparatus is attached to the central frame member of said collapsible frame assembly and comprises a strap means.

14. The apparatus of claim 13, wherein said strap means comprises a length of reusable self-adhering material.

15. The apparatus of claim 14, wherein said reusable self-adhering material comprises hook and loop fabric.

* * * * *